US008683062B2

(12) United States Patent
Ben-Shachar et al.

(10) Patent No.: US 8,683,062 B2
(45) Date of Patent: Mar. 25, 2014

(54) CENTRALIZED PUBLISHING OF NETWORK RESOURCES

(75) Inventors: Ido Ben-Shachar, Kirkland, WA (US); Ersev Samim Erdogan, Seattle, WA (US); Kevin Sott London, Monroe, WA (US); John E. Parsons, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 592 days.

(21) Appl. No.: 12/039,732

(22) Filed: Feb. 28, 2008

(65) Prior Publication Data

US 2009/0222565 A1 Sep. 3, 2009

(51) Int. Cl.
*G06F 15/16* (2006.01)

(52) U.S. Cl.
USPC ............ 709/229; 709/227; 709/217; 709/219

(58) Field of Classification Search
USPC .......................................... 709/229
See application file for complete search history.

(56) References Cited

U.S. PATENT DOCUMENTS

| | | | |
|---|---|---|---|
| 5,220,674 A | 6/1993 | Morgan et al. |
| 5,682,478 A | 10/1997 | Watson et al. |
| 5,764,887 A | 6/1998 | Kells et al. |
| 5,790,853 A | 8/1998 | Nomura et al. |
| 5,815,574 A | 9/1998 | Fortinsky |
| 5,884,046 A | 3/1999 | Antonov |
| 5,949,975 A | 9/1999 | Batty et al. |
| 6,049,828 A | 4/2000 | Dev et al. |
| 6,154,787 A | 11/2000 | Urevig et al. |
| 6,167,445 A | 12/2000 | Gai et al. |
| 6,310,889 B1 | 10/2001 | Parsons et al. |
| 6,452,692 B1 | 9/2002 | Yacoub |
| 6,463,454 B1 | 10/2002 | Lumelsky et al. |
| 6,463,459 B1 | 10/2002 | Orr et al. |
| 6,470,384 B1 | 10/2002 | O'Brien et al. |
| 6,473,794 B1 | 10/2002 | Guheen et al. |
| 6,510,523 B1 | 1/2003 | Perlman et al. |
| 6,519,571 B1 | 2/2003 | Guheen et al. |
| 6,536,037 B1 | 3/2003 | Guheen et al. |
| 6,552,813 B2 | 4/2003 | Yacoub |
| 6,560,609 B1 | 5/2003 | Frey et al. |
| 6,571,245 B2 | 5/2003 | Huang et al. |
| 6,594,684 B1 | 7/2003 | Hodjat et al. |
| 6,615,166 B1 | 9/2003 | Guheen et al. |

(Continued)

FOREIGN PATENT DOCUMENTS

| | | |
|---|---|---|
| CN | 1845069 | 10/2006 |
| KR | 20030003314 | 1/2003 |
| WO | WO2007075846 A2 | 7/2007 |

OTHER PUBLICATIONS

Miles, "Implementing Windows Terminal Server and Citrix MetaFrame on IBM @ server xSeries Servers", found at <<http://www.redbooks.ibm.com/redpapers/pdfs/redp3629.pdf>>, International Business Machines Corporation, Apr. 2003, 60 pgs.

(Continued)

*Primary Examiner* — Shripal Khajuria
(74) *Attorney, Agent, or Firm* — Lee & Hayes, PLLC

(57) ABSTRACT

Techniques for centralized publishing of network resources within computer networks are described. Publication of and access to the network resources are controlled from a single, centralized location, advantageously improving the uniformity of network administration responsibilities, and overall robustness of the network.

15 Claims, 5 Drawing Sheets

(56) References Cited

U.S. PATENT DOCUMENTS

| | | |
|---|---|---|
| 6,654,807 B2 | 11/2003 | Farber et al. |
| 6,675,198 B1 | 1/2004 | Hagiwara et al. |
| 6,714,987 B1 | 3/2004 | Amin et al. |
| 6,721,713 B1 | 4/2004 | Guheen et al. |
| 6,732,117 B1 | 5/2004 | Chilton |
| 6,816,905 B1 | 11/2004 | Sheets et al. |
| 6,836,786 B1 | 12/2004 | Zoller et al. |
| 6,854,016 B1 | 2/2005 | Kraenzel et al. |
| 6,915,345 B1 | 7/2005 | Tummala et al. |
| 6,922,724 B1 | 7/2005 | Freeman et al. |
| 6,954,930 B2 | 10/2005 | Drake et al. |
| 6,957,186 B1 | 10/2005 | Guheen et al. |
| 6,970,902 B1 | 11/2005 | Moon |
| 6,973,482 B2 | 12/2005 | Mohammed et al. |
| 6,976,262 B1 | 12/2005 | Davis et al. |
| 6,999,912 B2 | 2/2006 | Loisey et al. |
| 7,080,404 B2 | 7/2006 | Abdo et al. |
| 7,096,248 B2 | 8/2006 | Masters et al. |
| 7,100,199 B2 | 8/2006 | Ginter et al. |
| 7,111,060 B2 | 9/2006 | Araujo et al. |
| 7,130,891 B2 | 10/2006 | Bernardin et al. |
| 7,149,698 B2 | 12/2006 | Guheen et al. |
| 7,165,041 B1 | 1/2007 | Guheen et al. |
| 7,181,302 B2 | 2/2007 | Bayne |
| 7,257,613 B2 | 8/2007 | Boudnik et al. |
| 7,269,580 B2 | 9/2007 | Matichuk |
| 7,299,274 B2 | 11/2007 | Rajarajan et al. |
| 7,313,588 B1 | 12/2007 | Shotton, Jr. et al. |
| 7,330,872 B2 | 2/2008 | Peart et al. |
| 7,340,654 B2 | 3/2008 | Bigagli et al. |
| 7,363,363 B2 | 4/2008 | Dal Canto et al. |
| 7,502,726 B2 | 3/2009 | Panasyuk et al. |
| 7,584,274 B2 | 9/2009 | Bond et al. |
| 7,633,483 B2 | 12/2009 | Ben-Schachar et al. |
| 8,161,160 B2 | 4/2012 | London et al. |
| 8,272,045 B2 | 9/2012 | Azeez et al. |
| 2001/0047406 A1 | 11/2001 | Araujo et al. |
| 2002/0026590 A1 | 2/2002 | Kusunoki |
| 2002/0059073 A1 | 5/2002 | Zondervan et al. |
| 2002/0072974 A1 | 6/2002 | Pugliese, III et al. |
| 2002/0122056 A1 | 9/2002 | Bhesania et al. |
| 2002/0124082 A1 | 9/2002 | San Andres et al. |
| 2002/0129054 A1 | 9/2002 | Ferguson et al. |
| 2002/0174359 A1 | 11/2002 | Haltmeyer |
| 2002/0198965 A1 | 12/2002 | Kraft |
| 2003/0055968 A1 | 3/2003 | Hochmuth et al. |
| 2003/0126236 A1 | 7/2003 | Marl et al. |
| 2003/0126265 A1 | 7/2003 | Aziz et al. |
| 2003/0140143 A1 | 7/2003 | Wolf et al. |
| 2003/0182392 A1 | 9/2003 | Kramer |
| 2003/0195950 A1 | 10/2003 | Huang et al. |
| 2003/0217166 A1 | 11/2003 | Dal Canto et al. |
| 2004/0010786 A1 | 1/2004 | Cool et al. |
| 2004/0039827 A1 | 2/2004 | Thomas et al. |
| 2004/0045004 A1 | 3/2004 | Cheenath |
| 2004/0073621 A1 | 4/2004 | Sampson |
| 2004/0103339 A1 | 5/2004 | Chalasani et al. |
| 2004/0107125 A1 | 6/2004 | Guheen et al. |
| 2004/0111519 A1 | 6/2004 | Fu et al. |
| 2004/0167984 A1 | 8/2004 | Herrmann |
| 2004/0205473 A1 | 10/2004 | Fisher et al. |
| 2004/0213220 A1 | 10/2004 | Davis |
| 2004/0250130 A1 | 12/2004 | Billharz et al. |
| 2005/0010926 A1 | 1/2005 | Narayanaswamy et al. |
| 2005/0027784 A1 | 2/2005 | Fusari |
| 2005/0027787 A1* | 2/2005 | Kuhn et al. ............... 709/200 |
| 2005/0044225 A1 | 2/2005 | Ota et al. |
| 2005/0080909 A1 | 4/2005 | Panasyuk et al. |
| 2005/0080915 A1 | 4/2005 | Shoemaker et al. |
| 2005/0097506 A1 | 5/2005 | Heumesser |
| 2005/0125529 A1 | 6/2005 | Brockway et al. |
| 2005/0125530 A1 | 6/2005 | Brockway et al. |
| 2005/0125560 A1 | 6/2005 | Brockway et al. |
| 2005/0125739 A1 | 6/2005 | Thompson et al. |
| 2005/0182838 A1 | 8/2005 | Sheets et al. |
| 2005/0198303 A1 | 9/2005 | Knauerhase et al. |
| 2005/0198310 A1 | 9/2005 | Kim et al. |
| 2005/0251855 A1 | 11/2005 | Brandstatter |
| 2005/0267972 A1 | 12/2005 | Costa-Requena et al. |
| 2005/0267974 A1 | 12/2005 | Panasyuk et al. |
| 2006/0010125 A1 | 1/2006 | Beartusk et al. |
| 2006/0015740 A1 | 1/2006 | Kramer |
| 2006/0026235 A1 | 2/2006 | Schwarz et al. |
| 2006/0026284 A1 | 2/2006 | Nguyen |
| 2006/0029063 A1 | 2/2006 | Rao et al. |
| 2006/0052998 A1 | 3/2006 | Michelman |
| 2006/0069797 A1 | 3/2006 | Abdo et al. |
| 2006/0070131 A1 | 3/2006 | Braddy et al. |
| 2006/0112181 A1 | 5/2006 | Affaki |
| 2006/0136389 A1 | 6/2006 | Cover et al. |
| 2006/0142878 A1 | 6/2006 | Banik et al. |
| 2006/0143067 A1 | 6/2006 | Calabria |
| 2006/0143703 A1 | 6/2006 | Hopen et al. |
| 2006/0149567 A1* | 7/2006 | Muller et al. ............... 705/1 |
| 2006/0195895 A1 | 8/2006 | Ben-Shachar et al. |
| 2006/0230105 A1 | 10/2006 | Shappir et al. |
| 2006/0230156 A1 | 10/2006 | Shappir et al. |
| 2006/0230438 A1 | 10/2006 | Shappir et al. |
| 2006/0235851 A1* | 10/2006 | Akachi ............... 707/9 |
| 2006/0236325 A1 | 10/2006 | Rao et al. |
| 2006/0248180 A1 | 11/2006 | Bernardi et al. |
| 2006/0282855 A1 | 12/2006 | Margulis |
| 2007/0005595 A1 | 1/2007 | Gafter |
| 2007/0033290 A1 | 2/2007 | Valen, III et al. |
| 2007/0055650 A1 | 3/2007 | Duncan et al. |
| 2007/0061266 A1 | 3/2007 | Moore et al. |
| 2007/0094389 A1 | 4/2007 | Nussey et al. |
| 2007/0100900 A1 | 5/2007 | Gibbins |
| 2007/0124373 A1 | 5/2007 | Chatterjee et al. |
| 2007/0150551 A1 | 6/2007 | Krishnan et al. |
| 2007/0156687 A1 | 7/2007 | Idicula et al. |
| 2007/0156809 A1 | 7/2007 | Dickinson et al. |
| 2007/0162749 A1* | 7/2007 | Lim ............... 713/167 |
| 2007/0168525 A1 | 7/2007 | DeLeon, III et al. |
| 2007/0180448 A1 | 8/2007 | Low et al. |
| 2007/0192329 A1 | 8/2007 | Croft et al. |
| 2007/0198656 A1* | 8/2007 | Mazzaferri et al. ............... 709/218 |
| 2007/0203972 A1 | 8/2007 | Wewalaarachchi et al. |
| 2007/0233804 A1 | 10/2007 | Palekar et al. |
| 2007/0244966 A1 | 10/2007 | Stoyanov et al. |
| 2007/0245240 A1 | 10/2007 | Hudson, Jr. |
| 2007/0260738 A1 | 11/2007 | Palekar et al. |
| 2007/0282951 A1 | 12/2007 | Selimis et al. |
| 2008/0015927 A1 | 1/2008 | Ramirez |
| 2008/0034071 A1 | 2/2008 | Wilkinson et al. |
| 2008/0034408 A1 | 2/2008 | Duggal |
| 2008/0127348 A1 | 5/2008 | Largman et al. |
| 2008/0134143 A1* | 6/2008 | Hamid ............... 726/11 |
| 2008/0137133 A1 | 6/2008 | Trappe |
| 2008/0163171 A1 | 7/2008 | Chess et al. |
| 2008/0209538 A1 | 8/2008 | Malakapalli et al. |
| 2008/0222299 A1 | 9/2008 | Boodaei |
| 2008/0228865 A1 | 9/2008 | Cruzada |
| 2008/0235624 A1 | 9/2008 | Murata |
| 2008/0250407 A1 | 10/2008 | Dadhia et al. |
| 2009/0006537 A1 | 1/2009 | Palekar et al. |
| 2009/0222531 A1 | 9/2009 | London et al. |
| 2009/0222565 A1 | 9/2009 | Ben-Shachar et al. |
| 2010/0023582 A1 | 1/2010 | Pedersen et al. |

OTHER PUBLICATIONS

"Using Terminal Services in Application Server Mode with Small Business Server 2000," retrieved on Oct. 10, 2007 at <<http://www.microsoft.com/technet/prodtechnol/sbs/2000/maintain/termsvcs.mspx>>, 2002, 13 pgs.

"Technical Overview of Management Services," Microsoft Windows Server 2003, retrieved from <<http://download.microsoft.com/download/1/c/7/1c701994-9f8a-47c2-ad65-7265356c10eb/Manageover.doc>>, Jul. 2002, 47 pgs.

Gelu, "Securing Access to External Networks with Authentication, Authorization and Accountability", found at <<http://www.loloweb.dyns.cx/files/gsec_gelu_laurent.pdf>>, GIAC Security Essentials Certification (GSEC), Apr. 7, 2004, pp. 1-19.

(56) References Cited

OTHER PUBLICATIONS

Helander, et al., "eLearning for Engineering," 9th International Conference on Engineering Education, Session M5H, Jul. 23-28, 2006, 6 pgs.
General, "Secure Foundations for Microsoft Terminal Services," accessible at <<http://www.giac.org/certified_professionals/practicals/gsec/3578.phpu>>, GSEC Practical V1.4b, Jan. 11, 2004, pp. 1-21.
Tsai, et al., "Towards Ubiquitous Computing via Secure Desktop Service," accessible at <<http://ieeexplore.ieee.org/iel5/7544/20542/00949577.pdf?isNumber=>>, IEEE Catalog No. 01CH37239, 2001, pp. 187-190.
MacDonald, "Secure Access of Network Resources by Remote Clients," accessible at <<http://www.sans.org/reading_room/whitepapers/vpns/759.php>>, GSEC version 1.3, SANS Institute, 2002, Feb. 20, 2006, pp. 1-22.
"ProLiant Essentials Integrated Lights-Out Advanced Pack", available at least as early as Jun. 27, 2007, at <<http://h18000.www1.hp.com/products/quickspecs/11052_div/11052_div.HTML>>, Hewlett-Packard, 2004, pp. 1-3.
"iShadow Desktop—The Universal Citrix ICA, Terminal Services RDP, and VNC Client", available at least as early as Jun. 27, 2007, at <<http://www.dabcc.com/showcontent.aspx?id=2420>>, pp. 1-4.
Lubonski et al., "An Adaptation Architecture to Improve User-Perceived QoS of Multimedia Services for Enterprise Remote Desktop Protocols", Next Generation Internet Networks, 2005, Apr. 18-20, 2005, pp. 149-156.
"VMware Virtual Infrastructure", available at least as early as Jun. 27, 2007, at <<http://www.centriserv.com/products_vmware.php>>, CentriServ, 2006, pp. 1.
Mascolo et al., "XMILE: an XML based Approach for Incremental Code Mobility and Update," Automated Software Engineering, vol. 9, No. 2, Apr. 2002, found at <<http://www.cs.ucl.ac.uk/staff/c.mascolo/www/asemob.pdf>>, pp. 1-15.
Baude et al., "Interactive and Descriptor-based Deployment of Object-Oriented Grid Applications," Proceedings 11th IEEE Intl Symposium on High Performance Distributed Computing, 2002, found at at<<http://citeseer.ist.psu.edu/cache/papers/cs/26702/http:zSzzSzwww-sop.inria.frzSzoasiszSzJulien.VayssierezSzpublicationszSzhpdc2002_vayssiere.pdf/baude02interactive.pdf>>, 10 pgs.
Bhatia et al., "Extending Grid Protocols onto the Desktop using the Mozilla Framework," Proceedings of GCE'06, 2006, found at <<http://www.cogkit.org/GCE06/papers/CameraReady_126.pdf>>, pp. 1-4.
Rouse, "Managing Terminal Services with Group Policy," retrieved on Oct. 3, 2007 at <<http://www.msterminalservices.org/articles/Managing-Terminal-Services-Group-Policy.html>>, Mar. 15, 2007, 11 pgs.
"Terminal Services Gateway (TS Gateway)", retrieved on Oct. 3, 2007 at <<http://technet2.microsoft.com/windowsserver2008/en/library/9da3742f-699d-4476-b050-c50aa14aaf081033.mspx?mfr=true>>, Microsoft Corporation, Sep. 24, 2007, 8 pgs.
"Remote Users Group Policies," retrieved on Oct. 3, 2007 at <<http://www.cleo.net.uk/index.php?category_id=332>>, CLEO, 2005, 6 pgs.
Smith, "S.H.A.U.N: Secure Hospital Access from the University Network," available at <<http://www.ja.net/community/nhs/shaun.pdf>>, Addenbrooke's NHS Trust, Jan. 2004, pp. 1-11.
"TS Session Broker", Microsoft TechNet, Jan. 21, 2008, retrieved from the internet at <<http://technet.microsoft.com/en-us/library/cc732594(WS.10).aspx>>.
Office Action for U.S. Appl. No. 11/771,921, mailed on Apr. 29, 2011, Ashwin Palekar, "Virtual Desktop Integration with Terminal Services", 15 pages.
Non-Final Office Action for U.S. Appl. No. 12/163,673, mailed on Aug. 17, 2011, Ayesha M. Mascarenhas, "Integrated Client for Access to Remote Resources", 12 pages.

Office Action for U.S. Appl. No. 11/680,518, mailed on Aug. 2, 2011, Meher Malakapalli, "Strategies for Securely Applying Connection Policies via a Gateway", 40 pages.
Final Office Action for U.S. Appl. No. 12/103,542, mailed on Sep. 1, 2011, Ido Ben-Shachar, "Securely Pushing Connection Settings to a Terminal Server Using Tickets", 27 pages.
Office Action for U.S. Appl. No. 11/771,921, mailed on Dec. 8, 2011, Ashwin Palekar, "Virtual Desktop Integration with Terminal Services", 15 pgs.
Office Action for U.S. Appl. No. 12/163,673, mailed on Feb. 16, 2012, Ayesha M. Mascarenhas, "Integrated Client for Access to Remote Resources", 12 pgs.
"Access to Work—Dev Design Specification", Microsoft Confidential, Version 1, pp. 1-25, 2007.
Jose, "Workspace Versioning and Configuration Management API", retrieved on Apr. 15, 2008 at <<http://www.reswhitepapers.com/documents/VirtualizedUserWorkspaceManagementBeyondDesktopManagement.pdf>>, Java Boutique, pp. 1-3.
Koetzing, "Centralizing Application Access with Visionapp Workspace Management 2008", retrieved on Apr. 15, 2008 at <<http://www.thomaskoetzing.de/index.php?option=com_content&task=view&id=266&Itemid=289>>, Thomas Koetzing, Mar. 26, 2008, pp. 1-5.
"M2 Access to Work—Dev Design Specification", Microsoft Confidential, Version 1.0, pp. 1-21 , 2007.
"Virtualized User Workspace Management for Windows Environments", RES Software, 2007, pp. 1-6.
"Workspace Integration Into Win7 Networking UI—Feature Summary", Windows Server—Terminal Services Team, pp. 1-8 , 2007.
"Workspace Runtime—Dev Design Specification", Microsoft Confidential, Version 1, pp. 1-15 , 2007.
The Chinese Office Action mailed Dec. 14, 2012 for Chinese Patent application 200980107105.4, a counterpart foreign application of U.S. Appl. No. 12/039,725, 7 pages.
The Chinese Office Action mailed Mar. 3, 2012 for Chinese Patent application 200980107105.4, a counterpart foreign application of U.S. Appl. No. 12/039,725, 13 pages.
Office action for U.S. Appl. No. 11/771,921, mailed on Nov. 15, 2012, Palekar et al., "Virtual Desktop Integration with Terminal Services", 15 pages.
PCT International Search Report in Application PCT/US2009/066404, mailed Jan. 9, 2009, 2 pages.
PCT International Search Report in Application PCT/2009/032599 mailed Oct. 16, 2009, 7 pages.
PCT International Search Report and Written Opinion in Application PCT/US2008/053506, mailed Jun. 24, 2008, 6 pages.
PCT International Search Report and Written Opinion in Application PCT/US2009/032593, mailed Aug. 25, 2009, 12 pages.
The Chinese Office Action mailed May 29, 2013 for Chinese Patent application 200980107105.4. A counterpart foreign application of U.S. Appl. No. 12/039,725, 12 pages.
Translated Japanese Office Action mailed Jan. 18, 2013, for Japanese Patent application 2010-548775, a counterpart foreign application of U.S. Appl. No. 12/039,725, 9 pages.
Office action for U.S. Appl. No. 11/771,921, mailed on Jun. 10, 2013, Palekar et al., "Virtual Desktop Integration with Terminal Services", 25 pages.
RedCruise Corporation, "Front Line of RSS Media Business, Third Internet Media Following Email and Web, Part 1 Basics of RSS Technology, Part 2 Media Characteristics of RSS, Part 3 Examples of Use of RSS, Part 4 the Potential of RSS Is Limitless", Internet magazine make innovation with technology! No. 127, pp. 44-71, Impress Corporation, Japan, Aug. 1, 2005.
Russian Office Action mailed Feb. 6, 2013, for Russian Patent application 2010136035, a counterpart foreign application to U.S. Appl. No. 12/039,725, 5 pages.
Tulluch, et al., "Chapter 8, Enhancement of Functions of Termnal Service, 8.2 TS RemoteApp 8.3 TS Web Access", Introduction to Windows Server 2008 Technology, 1st Ed., pp. 202-216, Nikkei BP Soft Press, Inc., Japan, Nov. 2007.

* cited by examiner

CENTRALIZED PUBLISHING OF NETWORK RESOURCES

CROSS-REFERENCE TO RELATED APPLICATIONS

This patent application is related to co-pending, commonly-owned U.S. patent application Ser. No. 12/039,725 entitled "XML-Based Web Feed for Web Access of Remote Resources," filed concurrently herewith under Attorney Docket No. MS1-3651US, and co-pending, commonly-owned U.S. patent application Ser. No. 11/771,921 entitled "Virtual Desktop Integration with Terminal Services," filed on Jun. 29, 2007, which applications are incorporated herein by reference.

BACKGROUND

Terminal servers are typically special purpose computers that are used to connect a number of devices to one or more hosts or servers. Terminal servers may be particularly configured to facilitate communications between various components of a network. In some cases, terminal servers may be used to publish applications available on the hosts or servers to various other devices on the network. Networks having many devices may require groups of terminal servers (or "TS farms") to provide the required communication capability.

In conventional networks having multiple terminal servers, the database of which applications are currently published is replicated on multiple servers, leading to potential fragility. Similarly, an "Allow List" (a list which defines privileges of the various network devices to access the applications available on the host) is stored at each terminal server within the network (or a TS farm). If the data in any of these multiple storage locations of a network gets out of sync, service to end-users may be degraded, and the problems encountered may be difficult to diagnose. When a new application is made available, each Allow List stored at each storage location in the network must be manually updated. In short, although desirable results have been achieved using conventional terminal server publishing systems, there is room for improvement.

SUMMARY

Techniques for centralized publishing of resources on a computer network are described. Both publication of and access to the network resources are controlled from a single, centralized location. This advantageously removes the dependency of who controls access to the network resources from the particular publishing technology, thereby improving the uniformity of network administration responsibilities, and may also improve the overall efficiency and robustness of network resource publishing activities.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the use of the same reference numbers in different figures indicates similar or identical items.

DETAILED DESCRIPTION

Techniques for centralized publishing of resources on a computer network are disclosed herein. Generally, a single, centralized capability administers publication and access control to network resources, without regard for the particular publishing technology used by the network. As used herein, the term "resources" includes applications, patches and upgrades, desktops, directories, documents, data, or any other suitable computer resources that may be installed and shared to multiple entities throughout a network environment. Thus, rather than having multiple publications and multiple allow lists throughout a network pertaining to network resources, the administration of network resources is centralized. Embodiments in accordance with the present disclosure may thereby improve the efficiency of resource administration activities, the consistency of network resource privileges, and the overall robustness of the computer network.

Figure 1:
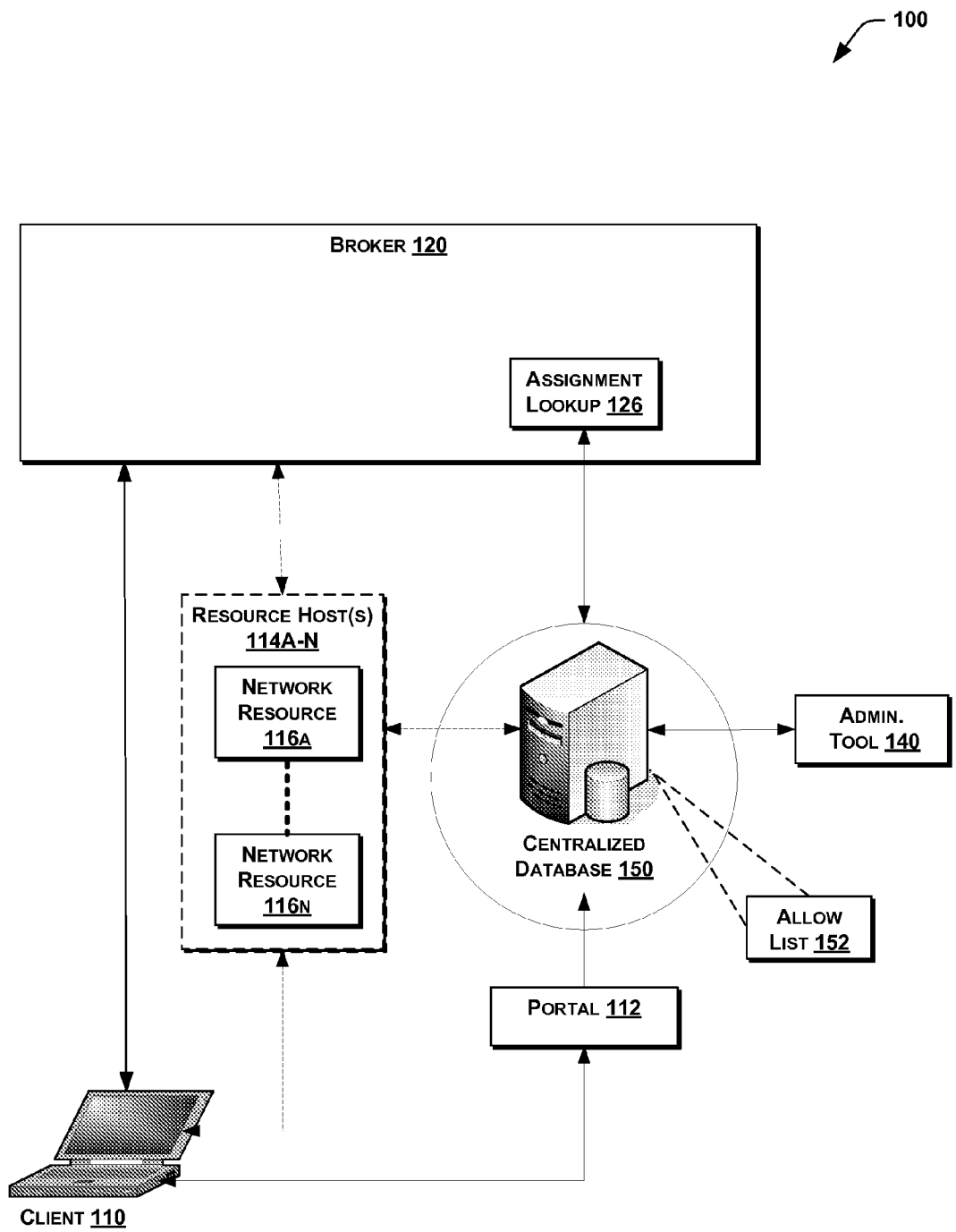
FIG. 1 illustrates an exemplary network for implementing techniques for centralized publishing of network resources. The network includes a centralized database configured to communicate to one or more clients over a network.

FIG. 1 illustrates an exemplary network 100 for implementing techniques for centralized publishing of network resources 116 in accordance with an embodiment of the present disclosure. In this embodiment, the network 100 includes a client 110 that operatively communicates via a portal 112 with a central database 150 for discovery of network resources 116. The client 110 also communicates with a broker 120 coupled to the central database 150 for connecting to and accessing the network resources 116. An administration tool 140 also accesses the central database 150. In some embodiments, the central database 150 may be a Terminal Server (TS) assignment policy database, and the administration tool 140 may be a TS administration tool. The network 100 further includes one or more resource hosts 114 (e.g. servers, etc.) that host one or more network resources 116 that may be accessed or used by the client 110. The resource hosts 114 may include, for example, terminal servers, directories, directory services (e.g. Active Directory), centralized publishing sources, or any other suitable hosts or sources.

It will be appreciated that various modules and techniques may be described herein in the general context of computer-executable instructions, such as program modules, executed by one or more computers or other devices. Generally, program modules include routines, programs, objects, components, data structures, and so forth for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Referring again to FIG. 1, the broker 120 may be configured to perform a variety of brokering activities associated with the network resources 116. For example, in the embodiment shown in FIG. 1, the broker 120 includes a lookup component 126 configured to access the centralized database 150 to determine whether the client 110 is authorized to access one or more network resources 116. For network resources 116 that the client 110 is authorized to access, the broker 120 may determine a best available location within the network 100 for the client 110 to access or operate the available network resource 116. This may, for example, be based on load balancing activities, or any other suitable methods.

In the embodiment shown in FIG. 1, the centralized database 150 may be accessed in at least three ways. First, the administration tool 140 may be used to add, remove, or change access assignments of network resources within the network 100. In some embodiments, the access assignments may be established based on user-groups within the network 100 using records (e.g. an allow list 152) stored within the centralized database 150. The administration tool 140 may provide a general ability to create, delete, change, read, and write all records within the centralized database 150.

The administration tool 140 may be configured to allow a variety of different administrative functions to be performed on the network 400. For example, the administration tool 140 may permit network resources 116 to be installed on the resource hosts 114, and may specify which publishing databases are trusted to control the network resources 116 on the resource hosts 114, and may allow revision of the allow list 152. The administration tool 140 may also install the publishing role on the centralized database 150 (or other component of the network 100), may set up one or more locations or databases of network resources 116, and control which network resources are published from which resource hosts to which users (or user-groups), and specify any additional constraints on the access of such network resources 116. The administration tool 140 may also make a list of resource hosts 114 (or publishing databases) more (or less) discoverable throughout the network 100, including an ability to lock down the list of publishing databases if so desired. The administration tool 140 may also control the ability of the portal 112 to access a set of resource hosts 114 (or publishing databases), and determine the set of resource hosts 114 the client 110 will see available.

A second way of accessing the central database 150 is via the portal 112, which permits access to the database 150 to query which network resources are available for a particular client 110. For example, in some embodiments, the portal 112 may be used to render a list of network resources (e.g. applications) to the client 110 that may be launched remotely by the client 110. More specifically, for each network resource, the portal 112 may make Remote Desktop Protocol (RDP) settings defined by the administration tool 140 available to the client 110, so that an end-user doesn't have to specify settings themselves. Such RDP settings may advantageously allow many settings to be controlled by a network administrator using the administration tool 140, such as, for example, whether the client 110 needs to turn on drive-redirection when accessing a particular Terminal Server.

In some embodiments, the portal 112 may receive a user identity from the client 110, and may return to the client 110 a list of network resources 116 available for access. For each network resource 116, the portal 112 may provide, for example, a name of the network resource 116, an icon for display, a resource host 114 (e.g. Terminal Server) on which to access the network resource 116, and a communication protocol to use when accessing the network resource 116 (e.g. RDP).

Third, the broker 120 may access the centralized database 150 to determine which portion of the network 100 (e.g. Terminal Server, etc.) is best suited to launch the network resource requested by the client 110. More specifically, the broker 120 may perform one or more of the brokering activities described above. In further embodiments, the broker 120 may perform one or more of the brokering activities described in previously-incorporated, commonly-owned U.S. patent application Ser. No. 11/771,921 entitled "Virtual Desktop Integration with Terminal Services," filed on Jun. 29, 2007. For example, in some embodiments, the broker 120 may receive the identity of the user from the client 110, along with the identity of the network resource 116 that the user desires to access. In turn, after the broker 120 accesses the centralized database 150, the broker 120 may provide an identity of the resource host 114 upon which to access the network resource 116, and a specified communication protocol to use for accessing the network resource 116.

Figure 2:
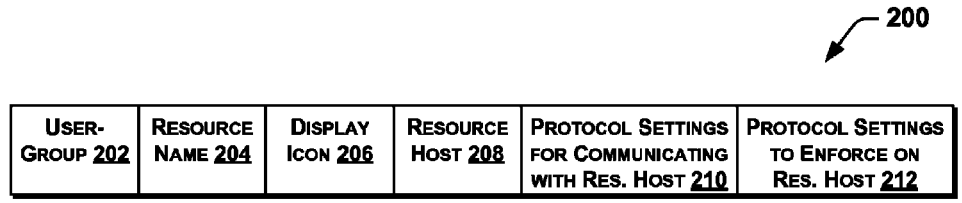
FIG. 2 is an exemplary record within the centralized database of FIG. 1.

FIG. 2 is an exemplary record 200 within the centralized database 150 of FIG. 1 in accordance with another embodiment of the present disclosure. In this embodiment, the record 200 includes a user-group 202 associated with the record 200, and a resource name 204 corresponding to the network resource 216 available on the network 100. The record 200 also includes an icon 206 associated with the network resource 116 that may be displayed on the client 110 to a user. An associated resource host 208 is identified for the users associated with the user-group 202 to use for accessing the network resource 116. The record 200 also includes protocol settings 210 for communicating with (e.g. sending to) the associated resource host 208, and also protocol settings 212 to enforce on the associated resource host 208.

Figure 3:
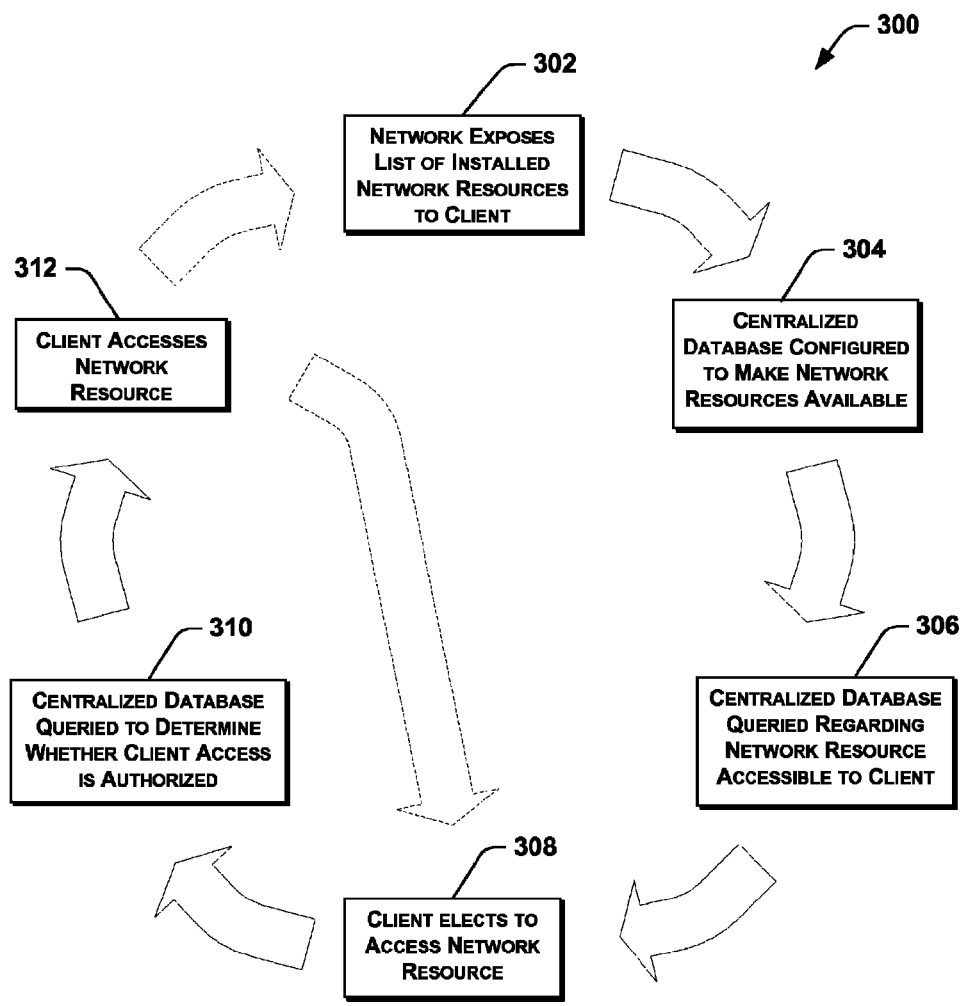
FIG. 3 is an exemplary data flow diagram for centralized publishing of network resources in accordance with another embodiment of the present disclosure.

FIG. 3 is an exemplary data flow diagram 300 for centralized publishing of network resources in accordance with another embodiment of the present disclosure. It should be appreciated that processes described herein, including the data flow diagram 300, are intended to provide possible implementations of the present disclosure, and that the present disclosure is not limited to the particular implementations described herein and shown in the accompanying figures. For example, in alternate implementations, certain acts need not be performed in the order described, and may be modified, and/or may be omitted entirely, depending on the circumstances. Moreover, in various implementations, the acts described may be implemented by a computer, controller, processor, programmable device, or any other suitable device, and may be based on instructions stored on one or more computer-readable media or otherwise stored or programmed into such devices. In the event that computer-readable media are used, the computer-readable media can be any available media that can be accessed by a device to implement the instructions stored thereon.

For convenience, the data flow diagram 300 will be described with reference to the exemplary network 100 of FIG. 1. In this embodiment, at 302, one or more components of the network 100 expose a list of installed network resources 116 to the client 110. In some embodiments, the list of installed network resources 116 may be exposed by a TS server as "tokens" (e.g. "application tokens") to the client 110.

At 304, the centralized database 150 is configured to make one or more of the installed network resources 116 available to the client 110. For example, an administrator may use the administration tool 140 to configure the centralized database 150 to make certain network resources 116 available (or unavailable) to the client 110. In some embodiments, the network resources 116 (e.g. applications) may be made available to certain user groups via an "allow list."

The centralized database 150 may be queried at 306 to determine which network resources are available to the client 110. For example, the centralized database 150 may be queried for a list of available network resources 116 that may be accessed by the client 110. Alternately, the centralized database 150 may be queried about a privilege of the client 110 to access a particular network resource 116. In the embodiment shown in FIG. 1, for example, the centralized database 150 may be queried by the portal 130, by the broker 120, or by any other suitable component of the network 100.

At 308, the client 110 elects to access a network resource 116. In some embodiments, the election of the network resource 116 may be accomplished by transmitting a resource-specific token (e.g. an application token) to the broker 120 via a suitable communication protocol (e.g. RDP). At 310, the centralized database 150 is queried to determine whether the client 110 is authorized to access the network resource 116. In some embodiments, the broker 120 queries the centralized database 150 as part of the brokering activities performed by the broker 120. At 312, if authorized, the client 110 accesses the selected network resource 116. The data flow diagram 300 may then end. Optionally, the data flow diagram 300 may return to 302 to repeat the above-described process, or may even return to electing to access other available network resources 116 at 308.

Techniques for centralized publishing of network resources in accordance with the present disclosure may provide significant advantages over the prior art. For example, such techniques may provide a single, centralized capability to publish and control access to network resources within a computer network, without regard for the particular publishing technology used by the network. The conventional practice of providing numerous access control lists distributed throughout the network may therefore be replaced with a single centralized database that controls such access throughout the network. As a result, the administrative activities associated with publishing and allowing network resources may be significantly simplified, and the efficiency and consistency of such activities greatly improved. Also, the overall robustness of the computer network may be considerably improved.

Figure 4:
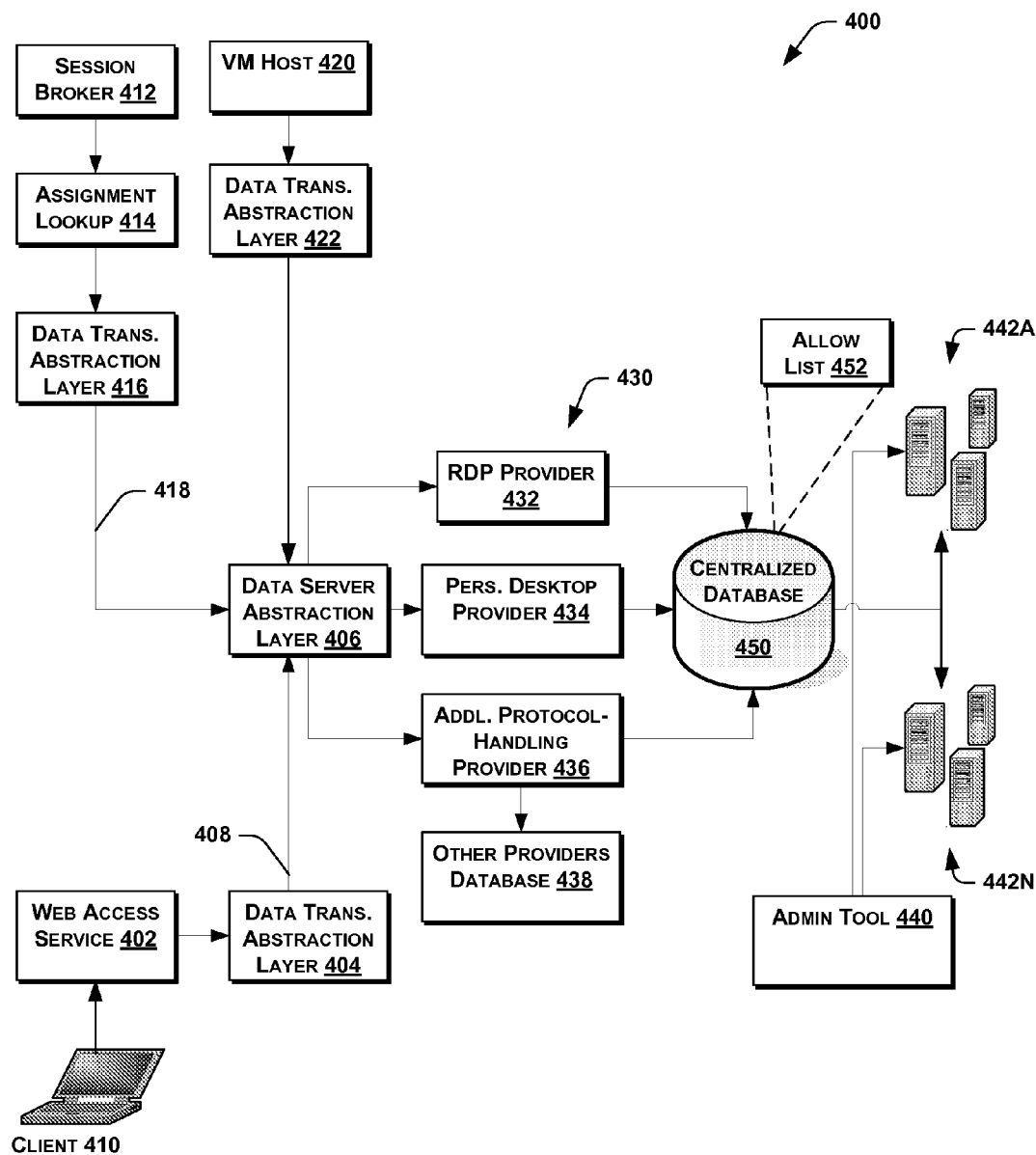
FIGS. 4 through 6 are exemplary networks for implementing techniques for centralized publishing of network resources in accordance with alternate embodiments of the present disclosure.

It will be appreciated that a variety of alternate embodiments may be conceived in accordance with the teachings of the present disclosure. For example, FIG. 4 is a network 400 for centralized publishing of network resources 116 in accordance with an alternate embodiment of the present disclosure. In this embodiment, the network 400 includes a client 410 that operatively communicates with a web access service 402. A data transmission abstraction layer 404 provides abstraction of data transmissions 408 between the web access service 402 and a data server abstraction layer 406. For example, in some embodiments, the data transmissions may be abstracted into a Remote Procedure Call (RPC) protocol, a Windows Management Instrumentation (WMI) protocol, or any other suitable communications protocol.

As further shown in FIG. 4, a session broker 412 communicates via an assignment lookup component 414 and a data transmission abstraction layer 416 with the data server abstraction layer 406. Similarly, a virtual machine (VM) host 420 communicates via a data transmission abstraction layer 422 with the data server abstraction layer 406.

In some embodiments, at least some of the communications with the data server abstraction layer 406 may be aliased. For example, if an aliased communication 418 specified "ICA/Wordpad," the aliased communication 418 may be interpreted by the client 110 to mean the network resource "Wordpad" accessed using an ICA (Independent Computer Architecture) remoting protocol, such as the ICA protocol available from Citrix Systems of Fort Lauderdale, Fla. Of course, other aliasing schema may be employed.

As shown in FIG. 4, the data server abstraction layer 406 may communicate with a centralized database 450 via a communication protocol layer 430. In this embodiment, the communication protocol layer 430 includes an RDP (Remote Desktop Protocol) provider 432 that facilitates RDP communications, a personal desktop provider 434 that allows an administrator to publish end-users' individual desktops as resources, and an additional protocol-handling provider 436 that may handle an additional communication protocol (e.g. ICA, RPC, etc.) and may draw necessary information from a database 438 regarding other communication protocol providers.

An administration tool 440 operatively communicates with one or more groups of resource hosts 442 (e.g. Terminal Server farms) that host one or more network resources. In turn, the groups of resource hosts 442 communicate with the centralized database 450 to update an allow list 452 that resides on the centralized database 450 and controls access to the network resources by the client 410 and other components of the network 400.

The network 400 shown in FIG. 4 may advantageously allow the integration of multiple network resources that previously were not supported by conventional network architectures. More specifically, by providing one or more of the data transmission abstraction layer 404, the data server abstraction layer 406, and the communication protocol layer 430 between the web access service 402 and the groups of resource hosts 442, the web access service 402 is able to access multiple groups of resource hosts 442 (rather than merely a single group of resource hosts 442). The network 400 thereby aggregates the multiple groups of resource hosts 442 for the web access service 402, and ultimately, for the client 110.

Furthermore, in some embodiments, since access control settings are pushed to the groups of resource hosts 442, if a particular machine or group of resource hosts 442 is unreachable, there may be situations where the settings become out of synch. The network 400 remedies this situation by providing the centralized database 450 as the back-end to store the settings, so that checking to see if a network resource is allowed to be launched is accomplished by querying the centralized database 450.

Figure 5:
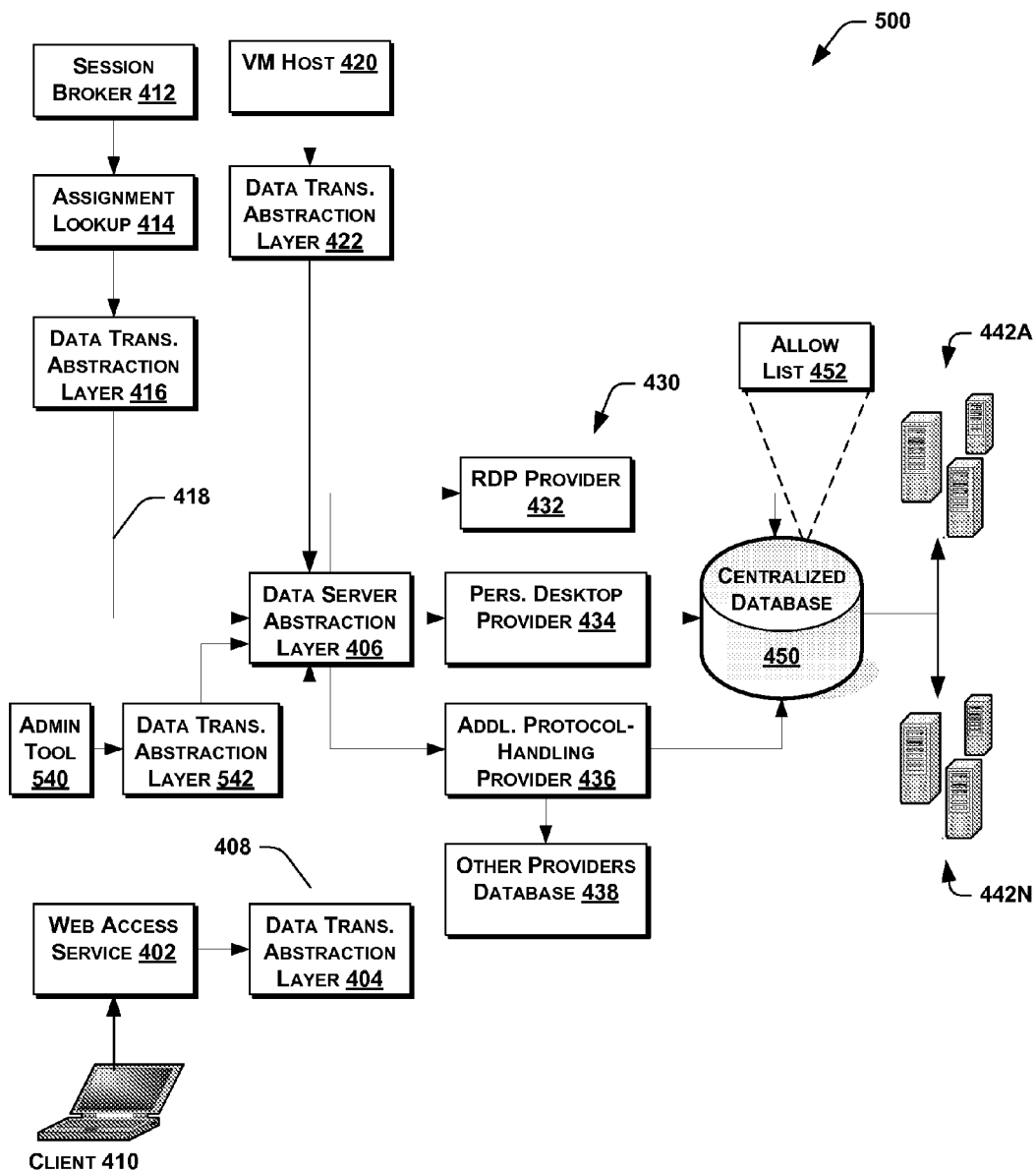

FIG. 5 is a network 500 for centralized publishing of network resources 116 in accordance with another embodiment of the present disclosure. The network 500 includes many of the same components as the previously-described network 400 shown in FIG. 4. In this embodiment, however, an administration tool 540 operatively communicates with the data server abstraction layer 406 via another data transmission abstraction layer 542. In this way, an administrator may perform one or more administrative functions on the centralized database 450 regarding publishing and controlling network resources 116 through the data server abstraction layer 406 and the communication protocol layer 430, without being required to manually edit multiple allow lists on members of the groups of resource hosts 442.

In addition to the advantages described above with respect to the network embodiment shown in FIG. 4, the network 500 may alleviate the need for network administrators to log on to multiple members of the groups of resource hosts 442.

Rather, the network 500 sets up the administration tool 540 so there is a global view and the settings are pushed to the various groups of resource hosts 442 (e.g. Terminal Server farms).

Figure 6:
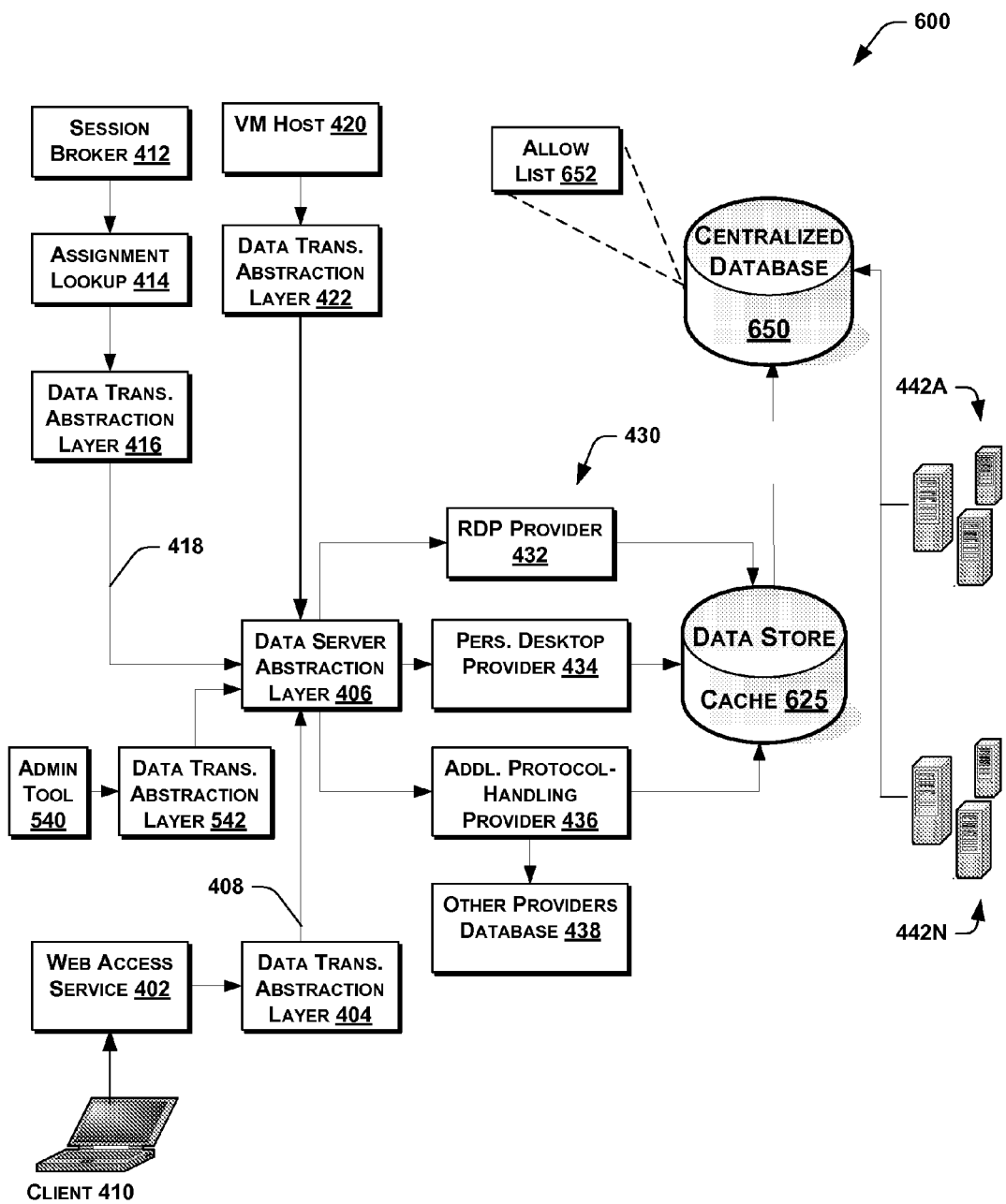

Similarly, FIG. 6 is a network 600 for centralized publishing of network resources 116 in accordance with yet another embodiment of the present disclosure. Again, the network 600 includes many of the same components as the previously-described network 500 shown in FIG. 5. In the implementation shown in FIG. 6, however, a data store cache 625 is disposed between the communication protocol layer 430 and a centralized database 650 that includes an allow list 652.

In addition to the advantages described above with respect to the network embodiments shown in FIGS. 4 and 5, the network 600 may provide an appropriate architecture to allow multiple administrators to be able to administer what network resources 116 are published and to allow delegation of privileges. The multiple administrators may, for example, be permitted to assert partial control over settings on the data store cache 625, while the centralized database 650 may remain the ultimate authority when checking to see whether a network resource 116 is allowed to be accessed.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer implemented method, comprising:
maintaining a centralized allow list to control access to applications of a computer network in a computer-readable central database;
receiving an update to the centralized allow list in the computer-readable central database from a terminal server that hosts one or more network applications that are access controlled according to the centralized allow list and remotely executable from a client computing device, the update being uploaded to the terminal server from an administrative tool that communicates with the terminal server;
receiving an access query for access from the client computing device to a particular application that is on the one or more terminal servers at the computer-readable central database, the access query including an alias for a name of the particular application, the alias specifying a communication protocol for accessing the particular application;
evaluating information in the access query against the centralized allow list to ascertain whether access privilege exists for accessing the particular application using the client computing device; and
when the access privilege is affirmative, granting access to the particular application on a specified terminal server at the client computing device, the granting including providing an identity of the specified terminal server from which to access the particular application.

2. The method of claim 1, wherein the maintaining the centralized allow list includes maintaining the centralized allow list in the computer-readable central database that is separate from the one or more terminal servers.

3. The method of claim 1, wherein the receiving the access query includes receiving the access query via a broker that performs a load balancing determination between a plurality of terminal servers.

4. The method of claim 1, wherein the granting access includes performing a load balancing determination between a plurality of terminal servers, and granting access to the particular application on a specified one of the plurality of terminal servers based on the load balancing determination.

5. The method of claim 1, wherein the evaluating information in the access query against the centralized allow list to ascertain whether access privilege exists for the particular application includes checking a data record that specifies an access privilege based on a user-group.

6. The method of claim 1, wherein the granting access further includes providing a communication protocol setting for communicating with the specified terminal server.

7. The method of claim 1, further comprising storing a local access list at each of the one or more terminal servers, each local access list controlling access to the applications solely on a corresponding terminal server.

8. The method of claim 1, wherein the receiving the access query includes receiving the access query via a data server abstraction layer.

9. The method of claim 8, wherein the receiving the access query further includes receiving the access query via a communication protocol layer having a plurality of protocol providers that enable communications using a plurality of communication protocols.

10. The method of claim 1, wherein receiving the access query includes receiving a request to access the particular application via a brokering component that determines which portion of the network is suitable for access to the particular application, the method further comprising identifying available applications to a requester via a communication portal other than the brokering component prior to ascertaining the access privilege.

11. One or more non-transmissible computer-readable storage media containing instructions that, when executed by a computer, perform acts for providing access to network resources in a computer network having a plurality of resource hosts, the acts comprising:
maintaining an allow list in a centralized database operatively coupled to the plurality of resource hosts, the allow list controlling access to each of the network resources stored on the plurality of resource hosts;
receiving an update to the allow list in the centralized database from a resource host that hosts one or more network applications that are access controlled according to the allow list and remotely executable from a client computing device, the update being uploaded to the resource host from an administrative tool that communicates with the resource host;
receiving an access query for a requester to access a network resource from the client computing device;
determining an access privilege based on the allow list of the centralized database for the requester; and
granting access to the network resource stored on a specified resource host at the client computing device using a communication protocol in response to determining the allow list authorizes access by the requester, the granting access including performing a load balancing determination between the plurality of resource hosts to select the specified resource host and identifying the specified resource host to the requester.

12. The non-transmissible computer-readable storage media of claim 11, wherein the maintaining the allow list in the centralized database includes maintaining the allow list in the centralized database that is separate from the plurality of resource hosts.

13. The non-transmissible computer-readable storage media of claim 11, wherein the receiving the access query to includes receiving the access query via a brokering component, further comprising identifying available network resources to the requester via a communication portal other than the brokering component.

14. A computer implemented method, comprising:

provinding a list of network applications available on a computer network having a plurality of resource hosts to one or more client computing devices;

maintaining an access record in a computer-readable centralized database server, the computer-readable centralized database server being distinct from the plurality of resource hosts;

receiving an update to the access record from a resource host that provides one or more network applications that are access controlled according to the access record and remotely executable from a client device, the update being uploaded to the resource host from an administrative tool that communicates with the resource host;

receiving an access query from a requester at a client computing device for access to a network application;

determining an access privilege of the requester to access the network application using the access record in the centralized database server;

determining one of the plurality of resource hosts that include the network application as a suitable resource host to launch the network application and a communication protocol setting for accessing the network application, the suitable resource host being selected through a load balancing determination between the plurality of resource hosts; and granting or denying access to the network application on the suitable resource host based on the access privilege, the granting including providing an identity of the suitable resource host from which to access the network application, and providing the communication protocol setting for communicating with the suitable resource host.

15. The method of claim 14, wherein the providing the list of network applications includes providing a list of network applications to the requester via a portal that is communicatively coupled between the one or more client computing devices and the computer-readable centralized database server.

* * * * *